(12) United States Patent
Asplund et al.

(10) Patent No.: US 11,374,640 B2
(45) Date of Patent: Jun. 28, 2022

(54) SELECTING A TRANSMISSION RANK IN A MULTIPLE BEAM ANTENNA SYSTEM

(71) Applicant: Telefonaktiebolaget LM Ericsson (publ), Stockholm (SE)

(72) Inventors: Henrik Asplund, Stockholm (SE); Fredrik Athley, Kullavik (SE); Magnus Thurfjell, Lulea (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 71 days.

(21) Appl. No.: 16/962,914

(22) PCT Filed: Feb. 1, 2018

(86) PCT No.: PCT/SE2018/050075
§ 371 (c)(1),
(2) Date: Jul. 17, 2020

(87) PCT Pub. No.: WO2019/151910
PCT Pub. Date: Aug. 8, 2019

(65) Prior Publication Data
US 2021/0067230 A1 Mar. 4, 2021

(51) Int. Cl.
*H04B 7/06* (2006.01)
*H04B 7/08* (2006.01)
(Continued)

(52) U.S. Cl.
CPC ......... *H04B 7/0695* (2013.01); *H04B 7/0639* (2013.01); *H04B 7/088* (2013.01); *H04L 1/0003* (2013.01); *H04W 72/1231* (2013.01)

(58) Field of Classification Search
CPC .... H04B 7/0695; H04B 7/0639; H04B 7/088; H04B 7/063; H04L 1/0003; H04W 72/1231
See application file for complete search history.

(56) References Cited

U.S. PATENT DOCUMENTS

2009/0086648 A1* 4/2009 Xu .............. H04B 7/0689
370/252
2011/0019559 A1 1/2011 Gore et al.
(Continued)

FOREIGN PATENT DOCUMENTS

EP 2826162 A1 1/2015
WO 2017075803 A1 5/2017

OTHER PUBLICATIONS

Extended European Search Report dated Aug. 3, 2021 for European Patent Application No. 18904313.6, 7 Pages.
(Continued)

*Primary Examiner* — Tejis Daya
(74) *Attorney, Agent, or Firm* — Sage Patent Group

(57) ABSTRACT

A method performed by a first radio node for selecting a transmission rank is provided. The radio node is capable of using at least a first antenna beam and a second antenna beam for communication with a second radio node in a wireless communication network. The radio node communicates with the second radio node by using the first antenna beam and a first transmission rank. The radio node obtains second radio parameters for the second antenna beam. The radio node then selects a second transmission rank based on the obtained second radio parameters. The second transmission rank is to be used for communication with the second radio node in the second beam. The selection of the second transmission rank is triggered before obtaining any Rank Indicator (RI) for the second antenna beam.

18 Claims, 10 Drawing Sheets

(51) Int. Cl.
*H04L 1/00* (2006.01)
*H04W 72/12* (2009.01)

(56) References Cited

U.S. PATENT DOCUMENTS

| | | | |
|---|---|---|---|
| 2011/0064159 A1* | 3/2011 | Ko | H04B 7/04 375/267 |
| 2011/0244905 A1* | 10/2011 | Burstrom | H04W 52/325 455/507 |
| 2013/0114455 A1* | 5/2013 | Yoo | H04W 72/082 370/252 |
| 2015/0358062 A1* | 12/2015 | Skillermark | H04L 1/0026 370/329 |
| 2019/0081676 A1* | 3/2019 | Wei | H04B 7/0695 |
| 2021/0135714 A1* | 5/2021 | Pezeshki | H04B 7/0617 |

OTHER PUBLICATIONS

PCT International Search Report and Written Opinion dated Nov. 30, 2018, for International Application PCT/SE2018/050075, 9 pages.
Huawei et al., 3GPP TSG RAN WG1 Meeting #88, R1-1701714, "Discussion on Downlink Beam Measurement and UE Reporting Procedure", Athens, Greece, Feb. 13-17, 2017, 10 pages.
Huawei et al., 3GPP TSG RAN WG1 Meeting NR#3, R1-1715467, "Beam Measurement and Reporting", Nagoya, Japan, Sep. 18-21, 2017, 9 pages.
3GPP, Technical Specification Group Radio Access Network, 3GPP TR 38.900 V14.1.0 (Sep. 2016), Study on Channel Model for Frequency Spectrum Above 6 GHz (Release 14), 81 pages.
RAN1 Chairman's Notes, 3GPP TSG RAN WG1 NR Ad-Hoc#2, Qingdao, P R. China, Published Jun. 27-30, 2017, 77 pages.
Simonsson, Ame et al., "NX 5G 15 GHz Test-bed Phase 2 Environment Impact, Kista-Yokosuka Comparison", Eridoc, Published 2016, 35 pages.

* cited by examiner

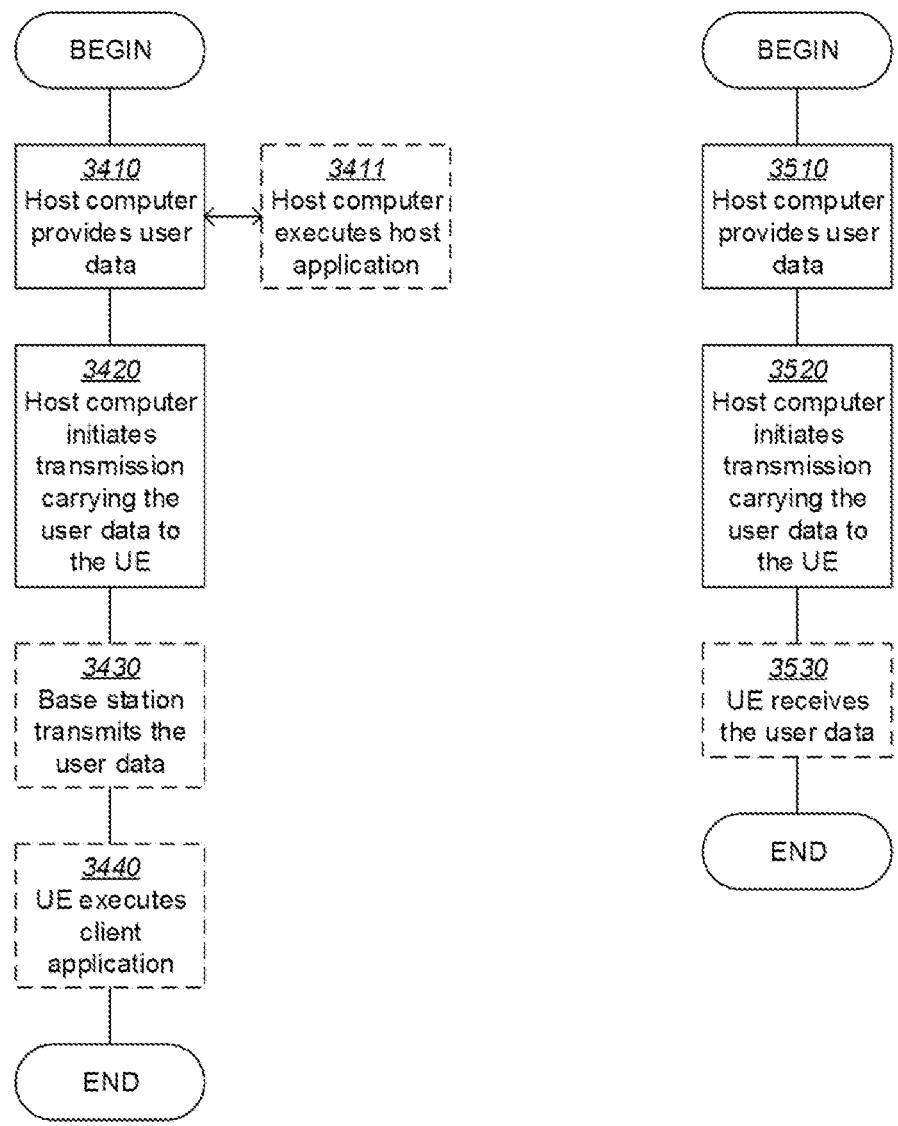

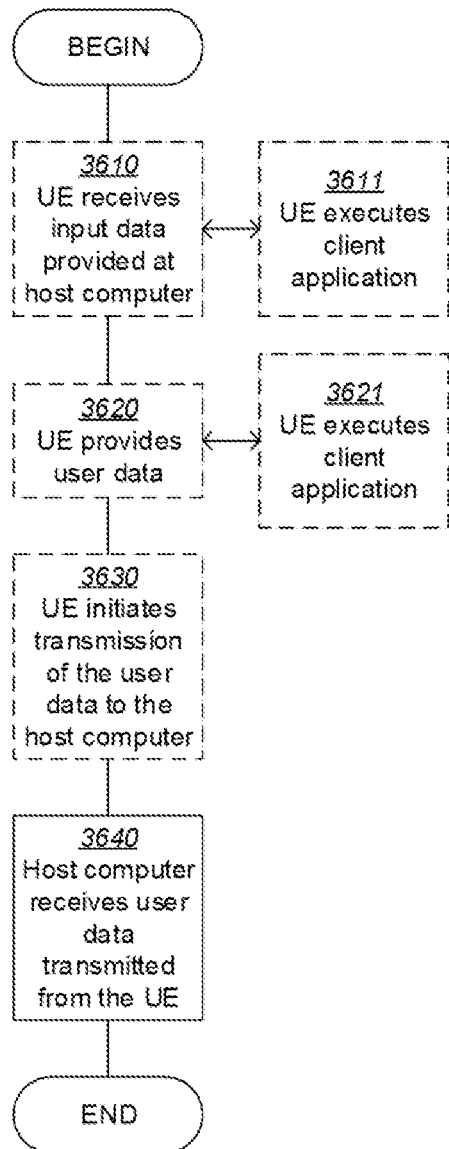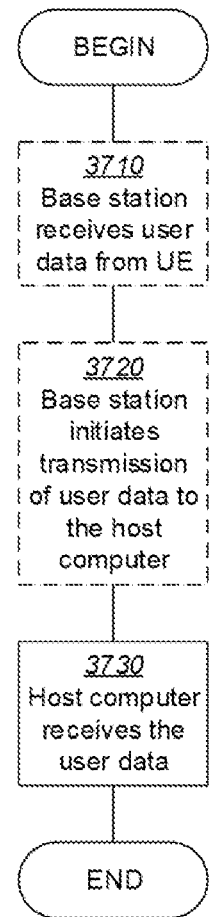
Fig. 11
Fig. 12

SELECTING A TRANSMISSION RANK IN A MULTIPLE BEAM ANTENNA SYSTEM

CROSS-REFERENCE TO RELATED APPLICATIONS

This application is a 35 U.S.C. § 371 national stage application for International Application No. PCT/SE2018/050075, entitled "SELECTING A TRANSMISSION RANK IN A MULTIPLE BEAM ANTENNA SYSTEM", filed on Feb. 1, 2018, the disclosures and contents of which are hereby incorporated by reference in their entireties.

TECHNICAL FIELD

Embodiments herein relate to a first radio node and methods therein. In particular, they relate to selecting a transmission rank in a wireless communications network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Link Adaptation

Link adaptation, or adaptive coding and modulation (ACM), is a term used in wireless communications to denote the matching of the modulation, coding and other signal and protocol parameters to the conditions on the radio link, e.g. the pathloss, interference due to signals coming from other transmitters, the sensitivity of a receiver, an available transmitter power margin, etc. The notion of ACM and transmission rank adaptation is a commonly used practice to reach spectral efficiency in radio communication systems. The radio system tries to select the spatial multiplexing transmission rank and used modulation and coding of the data to match the present channel quality including channel rank to achieve high system throughput and low delay. Link adaptation is used in 3GPP LTE in both uplink and downlink. The instantaneous channel quality is in the downlink estimated by the UE from reference signals transmitted from the base station. From the measurements a Rank Indicator (RI) and Channel Quality Indicator (CQI) and Precoder Matrix Inidcator (PMI) a report is formulized and transmitted in the uplink to the base station. It should be noted that RI/PMI may not be applicable to all transmission modes, but is e.g. applicable to those using spatial multiplexing.

RI is an indicator of the preferred transmission rank as estimated by the UE.

The base station may then select a transmission rank, modulation order and a code rate to use when addressing that UE based at least partially on the reported quality. In the uplink the channel quality can be estimated from UE transmissions. The transmission rank denotes the number of parallel data streams that is transmitted in a MIMO communication channel. The channel quality may be estimated using data transmissions or sounding transmissions, where sounding is a special reference signal used for channel estimation. The interference in the uplink may be estimated by just measuring the total received power and subtract the signal energy; it may hence be estimated even if the UE is not transmitting. The Modulation transmission rank and Coding Scheme (MCS) to be used in the uplink is then indicated to the UE in a grant. The grant is transmitted from the base station to the UE and indicates assigned resources.

Since the transmission rank must be selected prior to the transmission it is always based on an estimate of the actual channel quality experienced during the transmission. More or less advanced schemes may be used in the channel prediction, but a common method is to filter the historic values and add a back-off for the uncertainty in the estimate.

Beamforming

The large variety of requirements for the fifth Generation of mobile communications system (5G) implies that frequency bands at many different carrier frequencies will be needed. For example, low bands will be needed to achieve sufficient coverage and higher bands, e.g. Millimeter-wave (mmW) bands, i.e. near and above 30 GHz, will be needed to reach the required capacity. At high frequencies the propagation properties are more challenging and beamforming both at the gNB and at the UE might be required to reach sufficient link budget.

There are basically three different implementations of beamforming, both at the gNB and at the UE: analog beamforming, digital beamforming and hybrid beamforming. Each implementation has its advantages and disadvantages. Digital beamforming is the most flexible solution but also the costliest due to the large number of required radio chains and also baseband chains. A radio chain may e.g. comprise amplifiers, filters, A/D D/A converters, etc. A radio chain may e.g. comprise chain digital signal processing such Application-Specific Integrated Circuitry (ASIC); Field-Programmable Gate Array (FPGA) Digital Signal Processing (DSP). Analog beamforming is the least flexible but cheaper to manufacture due to reduced number of radio and baseband chains. Hybrid beamforming is a compromise between the analog and digital beamforming. One type of hybrid beamforming antenna architecture that has been agreed to study in 3GPP for the New Radio (NR) access technology in 5G is the concept of antenna panels. A panel is a rectangular antenna array of dual-polarized elements with typically one transmit/receive unit (TXRU) per polarization. An analog distribution network with phase shifters is used to steer the beam of each panel. Multiple panels may be stacked next to each other and digital precoding can be performed across the panels. FIG. 1 illustrates two examples of antenna panels with two panels each, two-dimensional panels to the left and one-dimensional panels to the right in FIG. 1, where each panel is connected to one TXRU per polarization.

In order to facilitate analog beamforming within an antenna panel, a set of procedures referred to as beam management is currently being standardized by 3GPP. The purpose of beam management is to discover and maintain beam pair links (BPLs). In the example of FIG. 2, one BPL has been discovered and is being maintained by the network. A BPL, i.e both the gNB beam and UE beam, is expected to be discovered and monitored by the network using measurements on downlink reference signals used for beam management.

One agreed procedure is that the gNB configures the UE to measure on a set of beamformed CSI-RS transmitted by the gNB. The UE measures Reference Signal Received Power (RSRP) and indicates a preferred gNB TX beam by reporting a CSI-RS Resource Indicator (CRI) and its associated RSRP to the gNB. It has also been discussed to allow a more detailed CSI reporting in the beam management step, e.g. CQI, RI, and PMI, which may be used for link adaptation. It has been agreed that a CSI-RS resource for beam management can have up to two ports. This means that detailed CSI in the beam management step for link adaptation is limited to up to two ports. In many cases, the data transmission is expected to be performed over more than two ports in order to increase transmission rank and throughput. In those cases, an additional CSI-RS transmission configured for CSI acquisition with more than two ports may be needed.

Measurements using experimental 5G test equipment have shown that a switch of gNB beam may result in significantly different channel characteristics including channel rank. A channel rank when used herein means the number of parallel MIMO data streams that would result in the highest throughput in the absence of other side constraints such as interference, data packet sizes, UE capabilities, resource sharing etc. Compared to the the transmission rank, the channel rank represents the potential for MIMO transmission while the transmission rank represents what is actually selected and used, which is a function of the channel rank but also the side constraints. In a beam switch, radio parameters such as CSI and RI may not always be available for the new beam. One example is if only CRI has been reported in a beam management process. Another example is if CSI has been reported for two ports in a beam management process, but the data transmission uses eight ports. Another case is if a beam selection has been made based on reciprocity. Based on Reciprocity when used herein means estimating the DL channel based on UL measurements, and vice versa. A significant change of channel characteristics without having CSI that reflects this change will have a negative impact on the link adaptation. Since transmission rank and MCS selection is important for link performance, a beam switch may lead to reduced performance even if the new has higher gain. A slow adaptation towards optimal transmission rank and MCS will increase the delay and may also result in a suboptimal bitrate for the duration of the data packet in case of short data packets being transmitted.

SUMMARY

An object of embodiments herein is to improve the performance of a wireless communications network using link adaptation.

According to a first aspect of embodiments herein, the object is achieved by a method performed by a first radio node for selecting a transmission rank. The radio node is capable of using at least a first antenna beam and a second antenna beam for communication with a second radio node in a wireless communication network. The radio node communicates with the second radio node by using the first antenna beam and a first transmission rank. The radio node obtains second radio parameters for the second antenna beam. The radio node then selects a second transmission rank based on the obtained second radio parameters. The second transmission rank is to be used for communication with the second radio node in the second beam. The selection of the second transmission rank is triggered before obtaining any Rank Indicator (RI) for the second antenna beam. The radio node switches from the first antenna beam to the second antenna beam, and then communicates with the second radio node by using the second antenna beam and the selected second transmission rank.

According to a second aspect of embodiments herein, the object is achieved by a first radio node for selecting a transmission rank. The radio node is accessible to at least a first antenna beam and a second antenna beam for communication with a second radio node in a wireless communication network. The first radio node is configured to:

Communicate with the second radio node by using the first antenna beam and a first transmission rank, obtain second radio parameters for the second antenna beam, select a second transmission rank based on the obtained second radio parameters, which second transmission rank is to be used for communication with the second radio node in the second beam, where the selection of the second transmission rank is to be triggered before obtaining any Rank Indicator (RI) for the second antenna beam, switch from the first antenna beam to the second antenna beam, and communicate with the second radio node by using the second antenna beam and the selected second transmission rank.

An advantage of embodiments herein is that they provide improved link adaptation resulting in increased throughput and capacity and shorter packet delay.

BRIEF DESCRIPTION OF THE DRAWINGS

Examples of embodiments herein are described in more detail with reference to attached drawings in which:

FIGS. 9 to 12 are flowcharts illustrating methods implemented in a communication system including a host computer, a base station and a user equipment.

DETAILED DESCRIPTION

Embodiments herein aims to integrate beam switch and link adaptation by letting a beam switch trigger a change of transmission rank before having received any detailed reports such as e.g. CSI and RI reports for the new beam.

Figure 1:
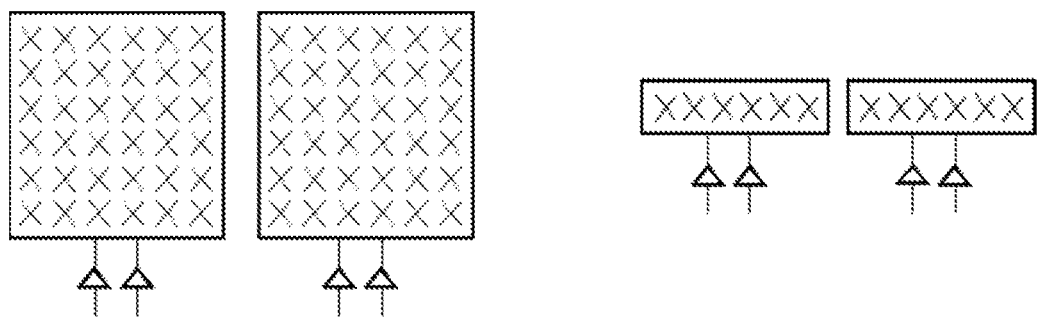
FIG. 1 is a schematic block diagram illustrating prior art.
Figure 2:
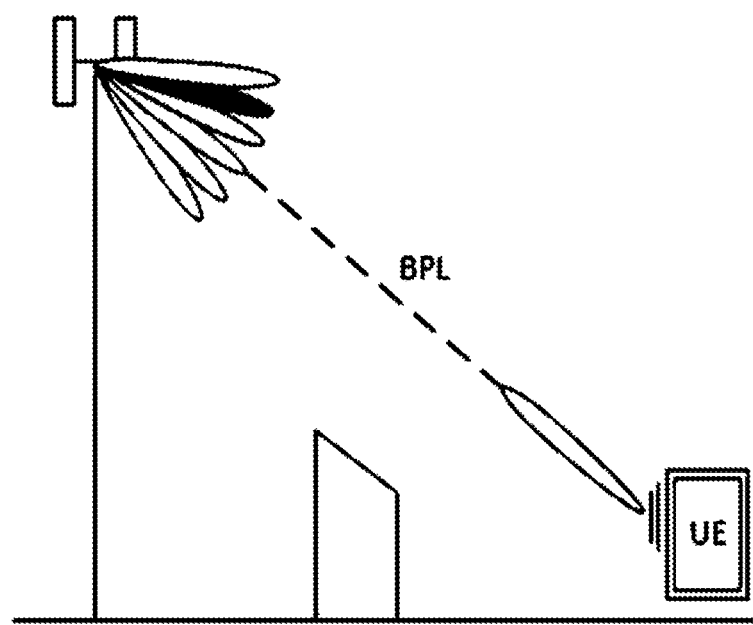
FIG. 2 is a schematic block diagram illustrating prior art.
Figure 3:
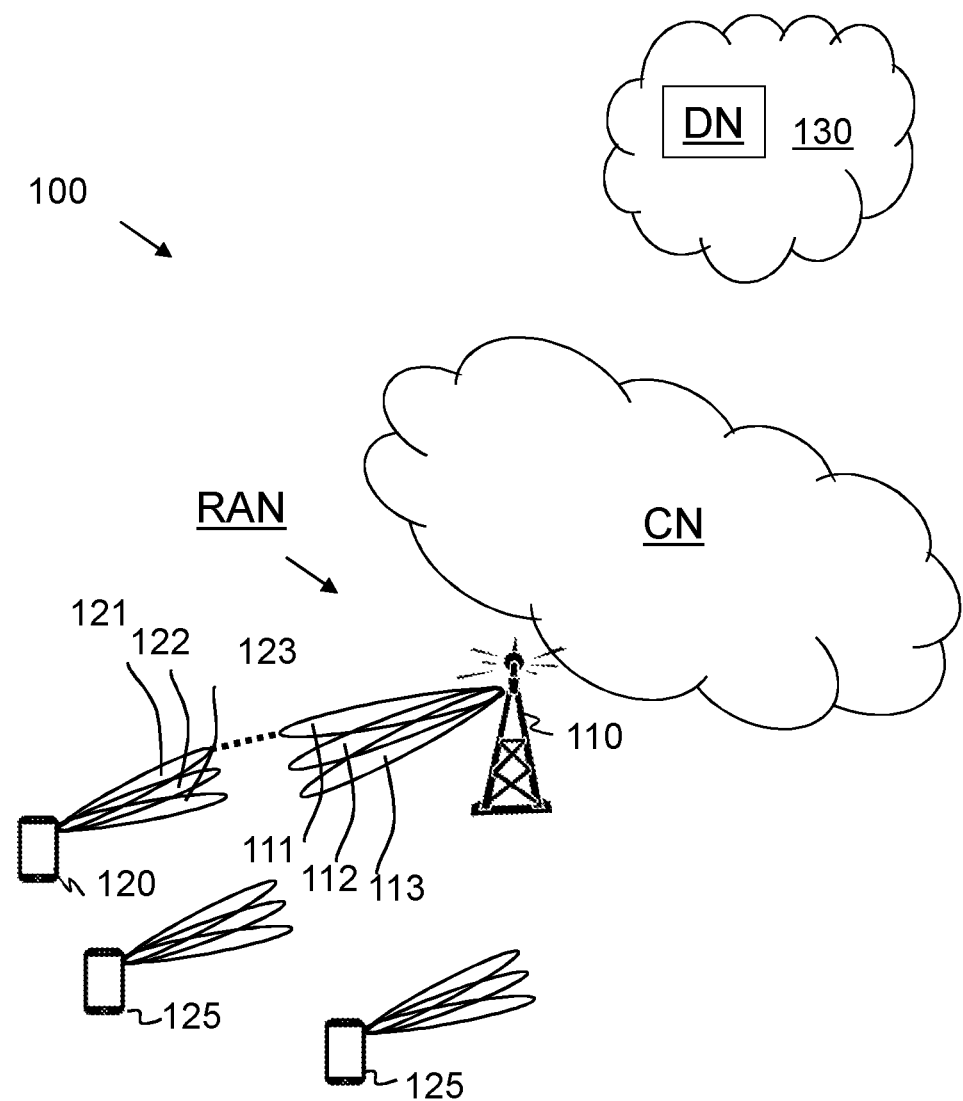
FIG. 3 is a schematic block diagram illustrating embodiments of a wireless communications network.

FIG. 3 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, W-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a first radio node 110, providing radio coverage over a geographical area by means of antenna beams. The a first radio node 110 may comprise one or more antenna beams such as first antenna beam, 111, a second antenna beam 112, and a third antenna beam 113. The geographical area may be referred to as a cell, a service area, beam or a group of beams.

The radio node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell 11 served by the radio node 110 depending e.g. on the radio access technology and terminology used. The radio node 110 may be referred to as a serving radio network node and may communicate via one or more of its antenna beams 111, 112, 113 with a second radio node 120 such as a UE with Downlink (DL) transmissions to the second radio node 120 and Uplink (UL) transmissions from the second radio node 120.

Radio nodes such as e.g. a second radio node 120 and one or more radio nodes 125 operate in the wireless communications network 100. The second radio node 120 may e.g. be a UE, an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that the second radio node relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell. The second radio node 120 communicates with network nodes such as the first radio node 110 by means of antenna beams in the second network node 120. The other radio nodes 125 also referred to as one or more radio nodes 125 communicates with network nodes such as the first radio node 110 by means of antenna beams in the respective other network nodes 125. The second radio node 120 may comprise one or more antenna beams such as first antenna beam 121, a second antenna beam 122, and a third antenna beam 123. The second radio node 120 may use one or more of its antenna beams 121, 122, 123 to communicate with the first radio node 110 via one or more of its antenna beams 111, 112, 113. In one example the first network node 110 uses its first antenna beam 111 to communicate via the first beam 121 of the second radio node 120 in a beam pair link (BPL) se dotted line in FIG. 3. There may a lot of different constellations of link pairs to communicate with such as e.g:

The first antenna beam 111 and the first antenna beam 121

The first antenna beam 111 and the second antenna beam 122

The first antenna beam 111 and the third antenna beam 123

The second antenna beam 112 and the first antenna beam 121,

The second antenna beam 112 and the second antenna beam 122,

Etc.

The methods according to embodiments herein are performed by the first radio node which e.g. may be any one out of a network node and a UE.

Methods according to embodiments herein may be performed by the first radio node 110. As an alternative, a Distributed Node DN and functionality, e.g. comprised in a cloud 130 as shown in FIG. 3 may be used for performing or partly performing the methods.

Figure 4:
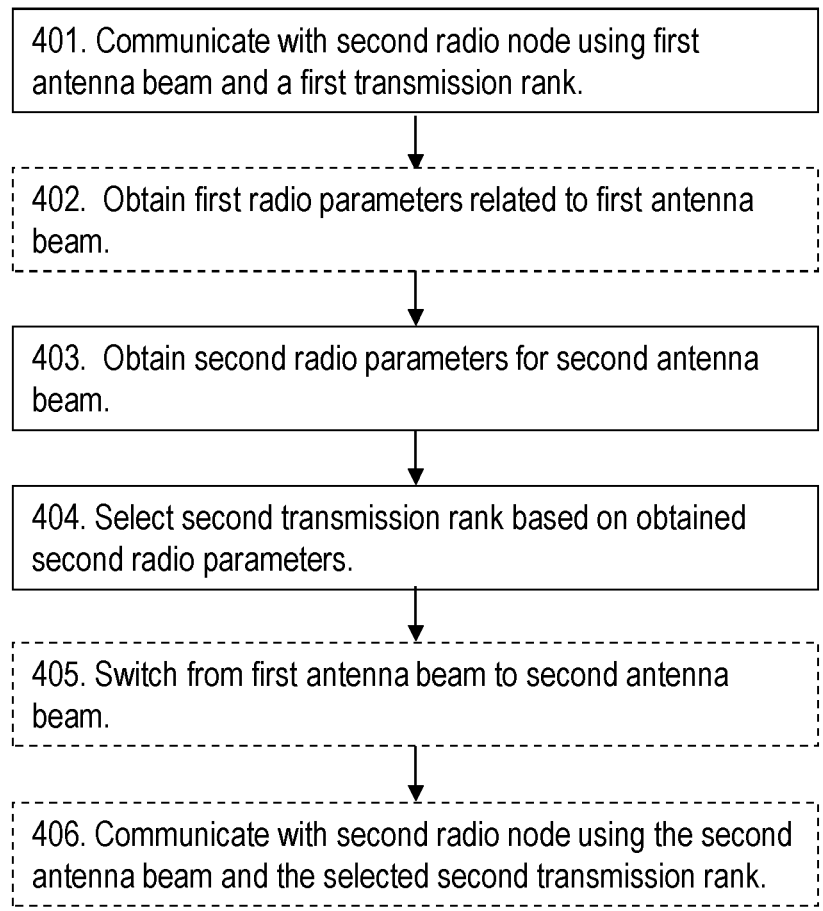
FIG. 4 is a flowchart depicting embodiments of a method in a radio node.

Example embodiments of a method performed by a first radio node 110 for selecting a transmission rank will now be described with reference to a flowchart depicted in FIG. 4. The radio node 110 is capable of using at least a first antenna beam and a second antenna beam for communication with a second radio node 120 in a wireless communication network 100. To be capable of using, also referred to as having access to the first antenna beam means to be capable of using any of the first antenna beam 111 of the first radio node and the first antenna beam 121 of the second radio node 120 in a beam pair. To is capable of using the second antenna beam means to have access to any of the second antenna beam 112 of the first radio node 110 and the second antenna beam 122 of the second radio node 120 in a beam pair.

The at least first antenna beam and second antenna beam may thus be provided by any one or more out of: the second radio node 120 and the radio node 110.

Each of the first antenna beam and second antenna beam may e.g. be any one out of: a transmitting beam, a receiving beam, an UL beam, DL beam.

The method comprises the following actions, which actions may be taken in any suitable order. Actions that are optional are presented in dashed boxes in FIG. 4.

Action 401

The first radio node 110 is communicating with the second radio node 120 by using the first antenna beam and a first transmission rank. According to an example scenario the first antenna beam is part of a first link pair such as e.g. being the first antenna beam 111 of the first radio node 110 paired with the any antenna bean of the second radio node 120. Another example is being the first antenna beam 121 of the second radio node 120 paired with any antenna beam of the first radio node 110.

Action 402

In some embodiments, the first radio node 110 obtains first radio parameters related to the first antenna beam. These may be used as when selecting a second transmission rank below. The first radio parameters may comprise a first signal strength.

Action 403

By some reason a switch to another antenna beam, such as the second antenna beam is needed.

According to an example scenario the second antenna beam is part of a second link pair such as e.g. being the second antenna beam 112 of the first radio node 110 paired with the any antenna bean of the second radio node 120. Another example is being the second antenna beam 122 of the second radio node 120 paired with any antenna beam of the first radio node 110.

According to embodiments herein some radio parameters for the second antenna beam is to be obtained. These will be needed later on to select a proper transmission rank for the second beam. This is according to some embodiments herein preferably performed before switching to the second antenna beam.

Thus, the first radio node 110 obtains second radio parameters for the second antenna beam. In some embodiments, the second radio parameters comprises a second signal strength.

In some alternative embodiments, the second radio parameters comprise rank statistics of transmission ranks used by one or more radio nodes 125 communicating on a respective antenna beam. The rank statistics may be collected over a period of time.

In some of these embodiments, the rank statistics of transmission ranks are further categorized into subgroups according to at least one out of:
  rank capabilities of the one or more radio nodes 125,
  the distances of the one or more radio nodes 125 to the first radio node 110,
  the strength of the signals transmitted to or received from the one or more radio nodes 125.

For example, in some of these embodiments rank statistics are collected per antenna beam and used as the preferred transmission rank when entering the corresponding antenna beam. In this way second radio parameters are obtained. This is e.g. performed by collecting over a period in time, information about used transmission rank for respective UEs such as the other radio nodes 125 communicating on an antenna beam with the first radio node 110. The idea is to collect statistics for several e.g. many, transmission beams. When the beam switch is to a specific beam, the collected rank statistics of that particular beam is considered referred to as "the corresponding beam" below. The rank statistics for each antenna beam may then be aggregated e.g. by averaging and used as a preferred transmission rank when entering the corresponding antenna beam, which in this example is the second antenna beam. If there are any of the one or more radio nodes 125 that has different rank capabilities, the rank statistics may be collected per rank capability category. UEs such as the one or more radio nodes 125 that are paired in a Multi User (MU)-MIMO configuration may in the simplest case be ignored in the statistics.

Collected rank statistics may also be separated within a beam. E.g. for different distances within each beam or different signal strength intervals within a beam. The distance may be known by e.g. timing advance etc. Thus, in some embodiments there are separated rank statistics within the respective antenna beams E.g. for different distances within each beam. In these embodiments the collected rank statistics may comprise the separated rank statistics.

Action 404

According to embodiments herein, the first radio node 110 selects a second transmission rank based on the obtained second radio parameters. The selection of the second transmission rank may further be based on the first radio parameters. The second transmission rank is to be used for communication with the second radio node 120 in the second beam.

In some embodiments the selection of the second transmission rank further comprises: selecting a second MCS. This means that in these embodiments also an MCS is selected for the second beam.

According to embodiments herein, the selection of the second transmission rank is triggered before obtaining any RI for the second antenna beam. This means that the second transmission rank is selected without complete channel information, e.g. no RI is reported. Since the switch is not performed yet, no complete channel related to the second beam is received yet. A complete channel information e.g. comprises RI, MCS signal strength, PMI, the complex channel matrix or a compressed representation thereof etc.

As mentioned above, in some embodiments, the second radio parameters comprises a second signal strength. If the first radio node 110 e.g. in such example scenarios, only has second radio parameters for the second antenna beam comprising information about the second signal strength, it should according to some embodiments herein, assume that if the signal strength increases compared to the first signal strength when an antenna beam change occurs, the transmission rank should be reduced. If the second signal strength decreases compared to the first signal strength it should assume that the rank should be increased. If the signal strengths stay the same or almost the same, no change in rank should be assumed. Thus, in some embodiments, the selection of the second transmission rank may comprise any one out of:
  When the first signal strength is a first threshold value below the second signal strength, selecting a reduced second transmission rank.

When the first signal strength is a second threshold value above the second signal strength, selecting an increased second transmission rank.

When the first signal strength is a third threshold value close to equal to the second signal strength, selecting the same second transmission rank as used for the first transmission beam.

The first threshold value may e.g. be represented by a power ratio between the first signal strength and the second signal strength measured in dB. Typical threshold values to achieve the effect according to embodiments herein may e.g. lie in the range 0-10 dB. However, other values may also be used. The third threshold value may e.g. be +3 dB to −3 dB.

These embodiments may e.g. be performed when the antenna beam switch is initiated by the second radio node 120 based on maximum throughput estimated by the second radio node 120.

Action 405

The first radio node 110 may then switch from the first antenna beam to the second antenna beam.

The first antenna beam may comprise any one out of: the first antenna beam 111 in the first radio node 110 or the first antenna beam 121 in the second radio node 120 as part of the first beam pair.

The switching from the first antenna beam to the second antenna beam may be any one out of:

For first beam pair comprising the first antenna beam 111 in the first radio node 110 communicating via the first antenna beam 121 in the second radio node 120:

Switching antenna beam in the first radio node 110, from the first antenna beam 111 to the second antenna beam 112. This results in the new, second beam pair comprising the second antenna beam 112 in the first radio node 110 communicating via the first antenna beam 121 in the second radio node 120, or switching antenna beam in the second radio node 120, from the first antenna beam 121 to the second antenna beam 122. This results in the new, second beam pair comprising the first antenna beam 111 in the first radio node 110 communicating via the second antenna beam 122 in the second radio node 120.

For beam pair comprising the first antenna beam 111 in the first radio node 110 communicating via the second antenna beam 122 in the second radio node 120:

Switching antenna beam in the first radio node 110, from the first antenna beam 111 to the second antenna beam 112. This results in the new, second beam pair comprising the second antenna beam 112 in the first radio node 110 communicating via the second antenna beam 122 in the second radio node 120.

For beam pair comprising the second antenna beam 112 in the first radio node 110 communicating via the first antenna beam 121 in the second radio node 120:

Switching antenna beam in the second radio node 120, from the first antenna beam 121 to the second antenna beam 122. This results in the new, second beam pair comprising the second antenna beam 112 in the first radio node 110 communicating via the second antenna beam 122 in the second radio node 120.

Action 406

The first radio node 110 may then communicate with the second radio node 120 by using the second antenna beam and the selected second transmission rank.

The above method gives according to embodiments herein, an improved link adaptation which in turn results in increased throughput and capacity and shorter packet delay. This is since the selected transmission rank is more likely to be aligned with the channel rank than when using methods known in the prior art, such as using the same transmission rank in the second beam as on the first beam which may lead to a mismatch between the transmission rank and the channel rank leading to transmission errors and lower throughput, or when delaying the selection of the channel rank and beam switch until further exchange of e.g. reference signals and channel quality reporting has been performed leading to an increased delay and hence a lower experienced throughput.

Reason for Triggering an Antenna Beam Shift.

Figure 5:
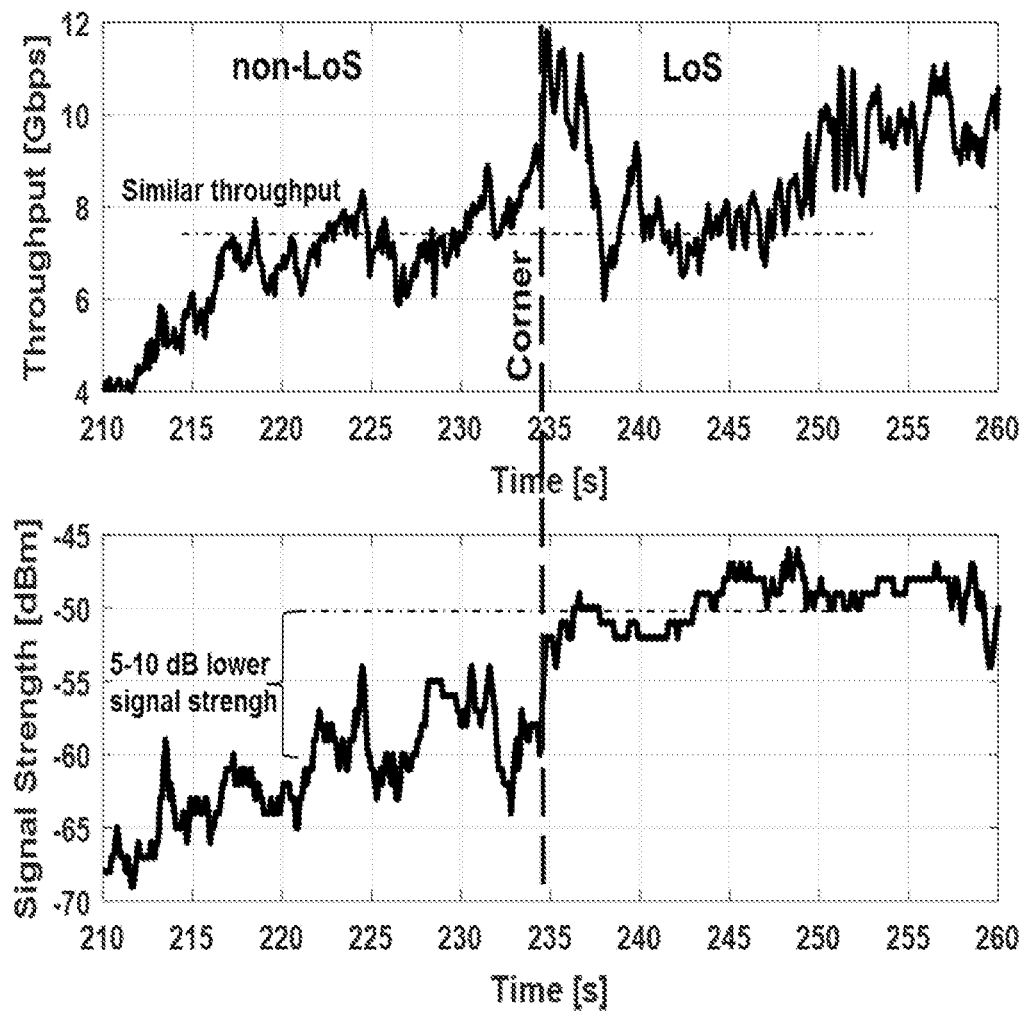
FIG. 5 is a diagram illustrating embodiments herein.

The transmission rank in the link adaptation may be changed at an antenna beam switch such as from the first antenna beam to the second antenna beam. An antenna beam switch may be triggered for different reasons. In some cases, a UE such as the second radio node 120 may move from Line of Sight (LoS) to non-LoS resulting in reduced signal strength but increased channel rank due to richer scattering. This is since the channel rank is closely coupled to the potential of the wireless channel to support multiple independent transmissions, e.g. along multiple resolvable propagation paths. Scattering when used herein means the interactions the radio waves experience with the environment, which tends to increase in a non-LoS environment giving rise to additional propagation paths between the transmitter and receiver. If the Signal to Interference and Noise Ratio (SINR) is high, spatial multiplexing may make this transition result in higher data rate and therefore trigger a beam switch even though the signal strength is reduced. Spatial multiplexing when used herein is a transmission technique in MIMO wireless communication to transmit independent and separately encoded data signals from the multiple transmit antennas. Empirical evidence for this is shown in FIG. 5 which shows two diagrams an upper diagram and a lower diagram with a corresponding time axis as the X axis. The upper diagram shows Throghput in Gbps as the Y axis and the lower diagram shows Signal strength in dBm as Y axis. FIG. 5 shows a measured example when a UE such as the second radio node 120 is communicating with a network node such as first radio node 110, and is moving from non-LoS of the first radio node 110, behind a building to LoS of the first radio node 110 when passing a corner of the building. The signal strength is increased 5-10 dB when entering LoS. I.e. the signal strength is 5-10 dB lower in the non-LoS as pointed out in the lower diagram of FIG. 5. The throughput is rather similar on both sides of the corner. The throughput is maintained despite lower signal strength behind the building. This indicate that throughput can be improved from a richer channel on cost of some degradation in signal strength. This is since the richer channel may support more simultaneous propagation paths along which the independent data signals can propagate while still being resolvable by the receiver.

Some embodiments herein may thus integrate link adaptation and beam switching by adjusting transmission rank in the link adaptation when performing a beam switch to the second antenna beam. Moreover synchronized beam switch with HARQ ACK by delaying a beam switch until all code words are completed may be enabled.

An example embodiment herein comprises a method performed in a radio transceiver device such as the first radio node 110 communicating with a mobile terminal such as the second radio node 120. In this example there are at least two alternative analog or analog-digital hybrid antenna beams to use for communication. The a radio transceiver device performs the method comprising: obtaining first radio parameters for used first antenna beam, obtaining second radio parameters for second new beam, selecting transmission rank based on radio parameters for first and second beam, and switching beam.

The radio parameters for the second beam may be obtained before beam switch. The first and second radio parameters may be signal strength.

The radio parameters may be obtained by measuring on the received transmission from the mobile terminal.

In some embodiments also MCS may adjusted for the second beam.

Figure 6A:
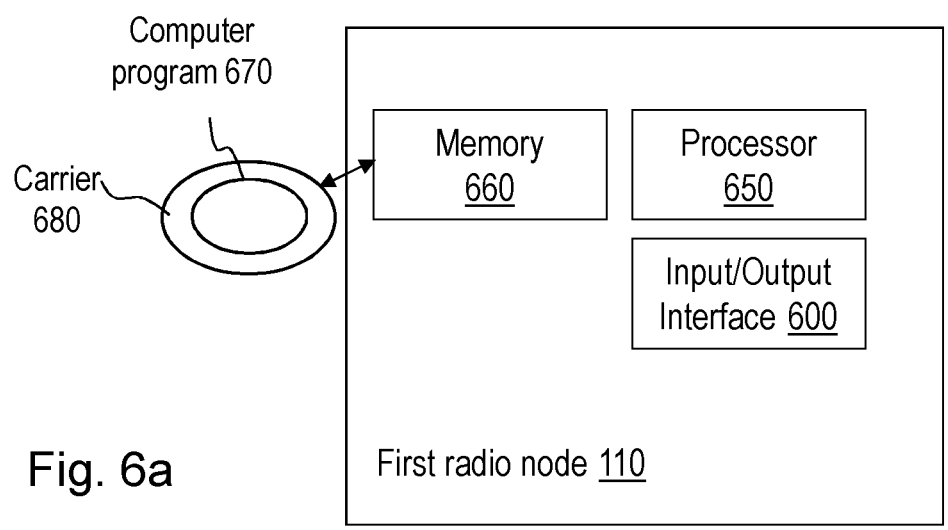
FIGS. 6a, b are schematic block diagrams illustrating embodiments of a radio node.
Figure 6B:
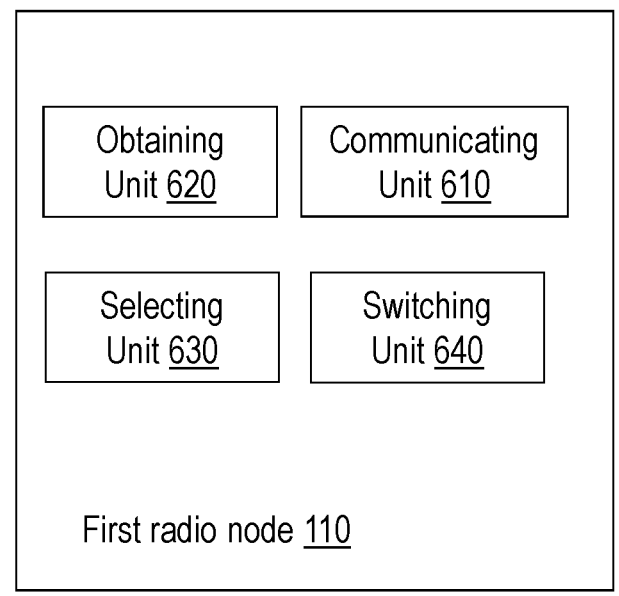

To perform the method actions for selecting a transmission rank, the first radio node 110 may comprise the arrangement depicted in FIGS. 6a and 6b. As mentioned above the radio node 110 is accessible to at least the first antenna beam and the second antenna beam for communication with the second radio node 120 in the wireless communication network 100.

The first radio node 110 may comprise an input and output interface 600 configured to communicate e.g. with the second radio node 120. The input and output interface 600 may comprise a wireless receiver (not shown) and a wireless transmitter (not shown).

The first radio node 110 is configured to, e.g. by means of a communicating unit 610 configured to, communicate with the second radio node 120 by using the first antenna beam and a first transmission rank.

The first radio node 110 is configured to, e.g. by means of a obtaining unit 620 configured to, obtain second radio parameters for the second antenna beam.

The first radio node 110 is further configured to, e.g. by means of a selecting unit 630 configured to, select a second transmission rank based on the obtained second radio parameters. The second transmission rank is to be used for communication with the second radio node 120 in the second beam. The selection of the second transmission rank is to be triggered before obtaining any RI for the second antenna beam.

The first radio node 110 may further configured to, e.g. by means of a switching unit 640 configured to, switch from the first antenna beam to the second antenna beam.

The first radio node 110 may further be configured to, e.g. by means of the communicating unit 610 configured to, communicate with the second radio node 120 by using the second antenna beam and the selected second transmission rank.

The first radio node 110 may further be configured to,
e.g. by means of the obtaining unit 620 configured to, obtain first radio parameters related to the first antenna beam, and
e.g. by means of the selecting unit 630 configured to, select the second transmission rank further based on the first radio parameters.

In some embodiments the first radio parameters are adapted to comprise a first signal strength and the second radio parameters are adapted to comprise a second signal strength.

In these embodiments, the first radio node 110 may further configured to, e.g. by means of the selecting unit 630 configured to, select the second transmission rank according to any one out of:

When the first signal strength is a first threshold value below the second signal strength, select a reduced second transmission rank;

when the first signal strength is a second threshold value above the second signal strength, select an increased second transmission rank, and when the first signal strength is a third threshold value close to equal to the second signal strength, select the same second transmission rank as used for the first transmission beam.

In some embodiments, the first radio node 110 may further configured to, e.g. by means of the selecting unit 630 configured to, select the second transmission rank by further selecting a second Modulation transmission rank and Coding Scheme, MCS.

In some embodiments, the second radio parameters is adapted to comprise rank statistics of transmission ranks collected over a period of time, used by one or more radio nodes 125 communicating on a respective antenna beam.

In some embodiments, there are at least some of the one or more radio nodes 125 that are adapted to have different rank capabilities. In these embodiments, the rank statistics may be adapted to be collected per rank capability category.

In some embodiments, there are adapted to be separated rank statistics within the respective antenna beams. In these embodiments, the collected rank statistics may be adapted to comprise the separated rank statistics.

The at least first antenna beam and second antenna beam may be adapted to be provided by any one or more out of: the second radio node 120 and the radio node 110.

In some embodiments, the rank statistics of transmission ranks are adapted to be further categorized into subgroups according to one or more out of:
  rank capabilities of the one or more radio nodes 125,
  the distances of the one or more radio nodes 125 to the first radio node 110,
  the strength of the signals transmitted to or received from the one or more radio nodes 125.

The embodiments herein may be implemented through a respective processor or one or more processors, such as a processor 650 of a processing circuitry in the first radio node 110 depicted in FIG. 6, together with a respective computer program code for performing the functions and actions of the embodiments herein. The program code mentioned above may also be provided as a computer program product, for instance in the form of a data carrier carrying computer program code for performing the embodiments herein when being loaded into the first radio node 110. One such carrier may be in the form of a CD ROM disc. It is however feasible with other data carriers such as a memory stick. The computer program code may furthermore be provided as pure program code on a server and downloaded to the first radio node 110.

The radio node 110, 120 may further comprise a memory 660 comprising one or more memory units. The memory comprises instructions executable by the processor in. The memory 660 is arranged to be used to store e.g. first and second radio parameters, second transmission ranks, rank statistics, rank capabilities, options, and applications to perform the methods herein when being executed in the first radio node 110.

The first radio node 110 may e.g. comprise the communicating unit 610, the obtaining unit 620, the selecting unit 630, the switching unit 640, described above. Those skilled in the art will also appreciate that the units in the first radio node 110 mentioned above may refer to a combination of analog and digital circuits, and/or one or more processors configured with software and/or firmware, e.g. stored in the first radio node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 670 comprises instructions, which when executed by the respective at least one processor 650, cause the at least one processor 650 of the first radio node 110 to perform the actions above.

In some embodiments, a carrier 680 comprises the computer program 670, wherein the carrier 680 is one of an electronic signal, an optical signal, an electromagnetic signal, a magnetic signal, an electric signal, a radio signal, a microwave signal, or a computer-readable storage medium.

Further Extensions and Variations

Figure 7:
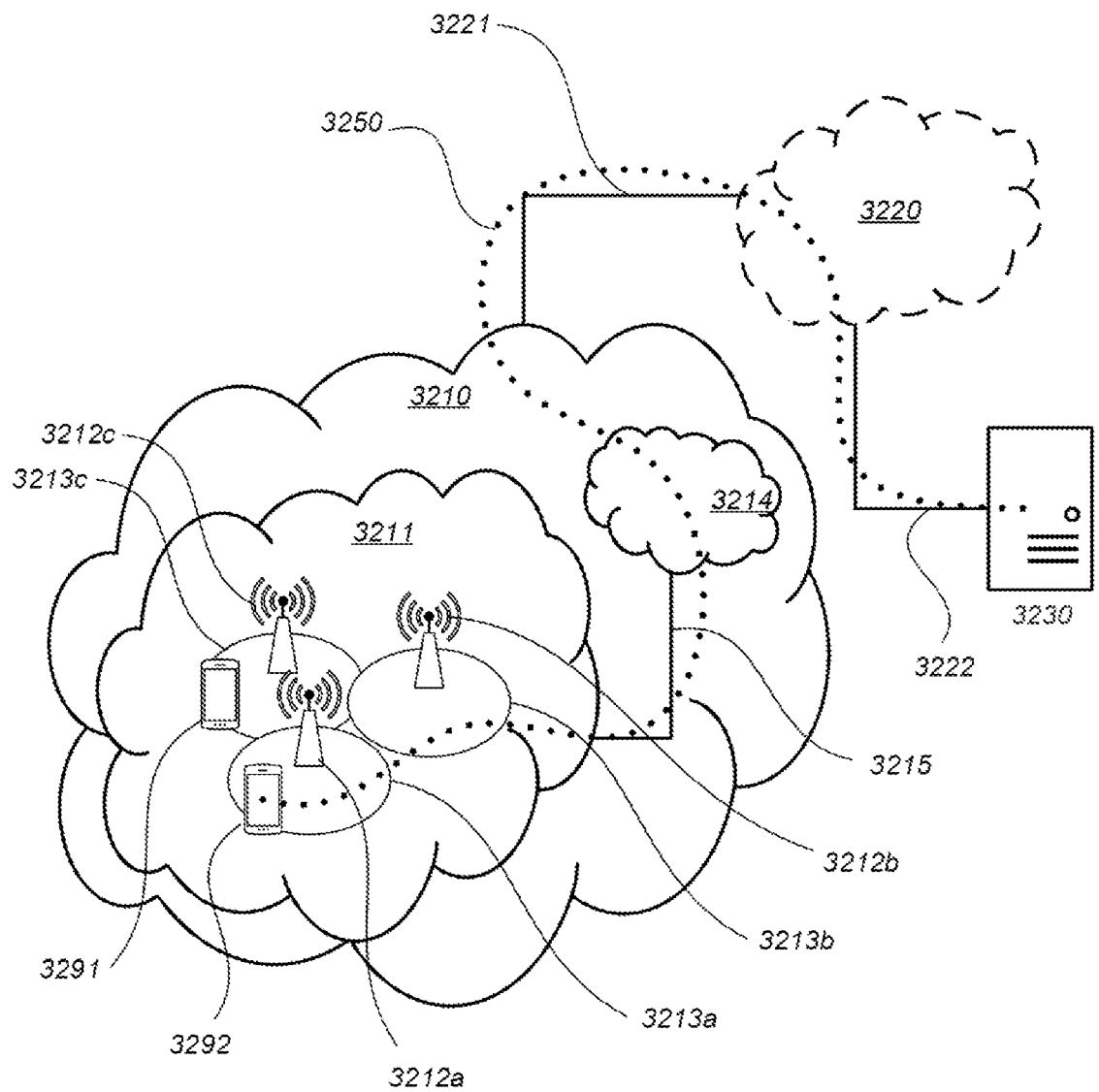
FIG. 7 schematically illustrates a telecommunication network connected via an intermediate network to a host computer.

With reference to FIG. 7, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

Figure 8:
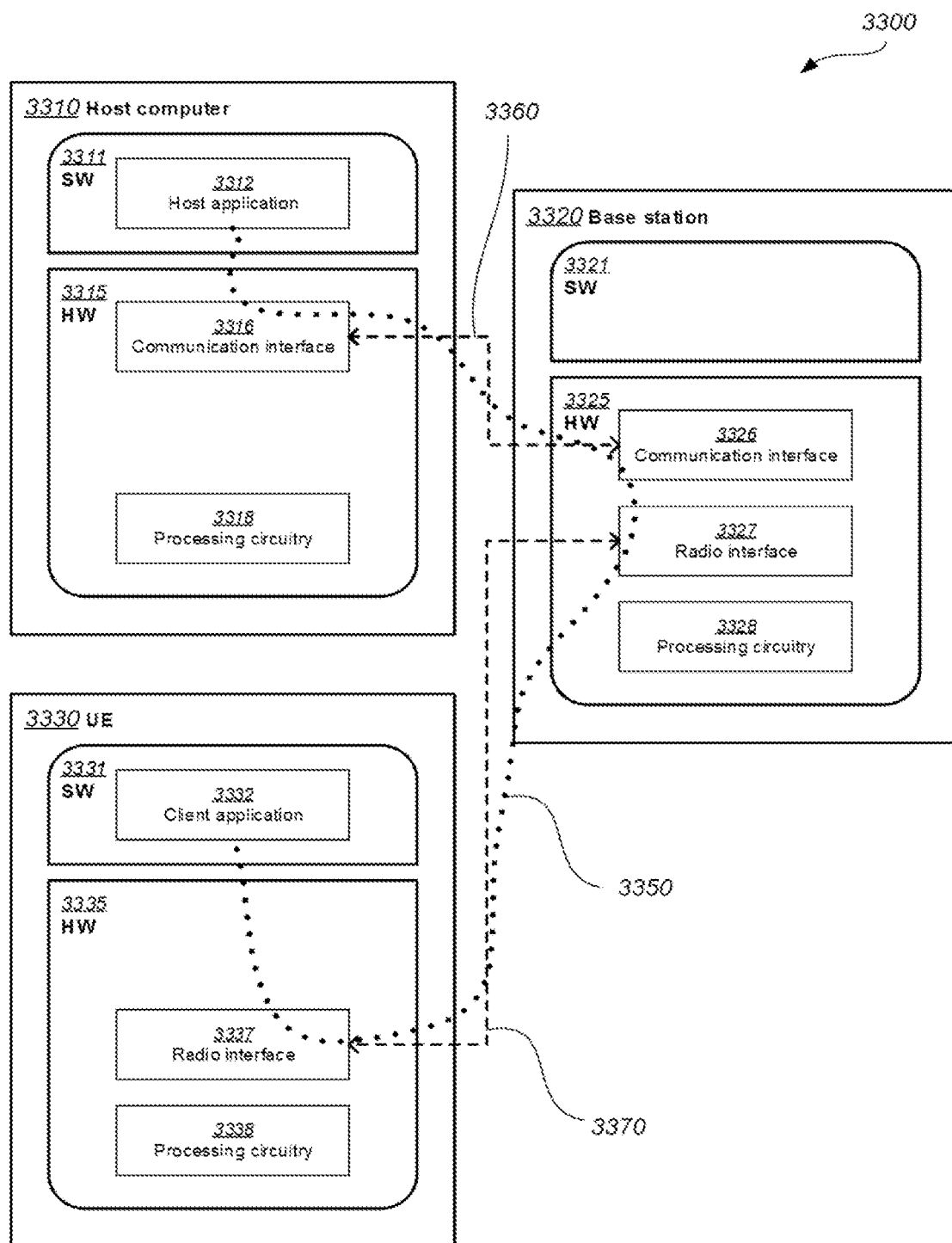
FIG. 8 is a generalized block diagram of a host computer communicating via a base station with a user equipment over a partially wireless connection.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 9 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 10 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 11 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 12 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

ABBREVIATION EXPLANATION

ACK Acknowledgment
BPL Beam pair link
CSI Channel State Information
CSI-RS CSI Reference Symbols
CQI Channel Quality Indicator
CRI CSI-RS resource indicator
gNB next generation NodeB
HARQ Hybrid automatic repeat request
LoS Line-of-sight
MCS Modulation and coding scheme
NLoS Non line-of-sight
PMI Precoding matrix indicator
RI Rank indicator
RX Receiver
SRS Sounding Reference Symbol
TX Transmitter
UE User Equipment

The invention claimed is:

1. A method performed by a first radio node for selecting a transmission rank, wherein the radio node is capable of using at least a first antenna beam and a second antenna beam for communication with a second radio node in a wireless communication network, the method comprising:
communicating with the second radio node by using the first antenna beam and a first transmission rank,
obtaining second radio parameters for the second antenna beam, and
selecting a second transmission rank based on the obtained second radio parameters, which second transmission rank is to be used for communication with the second radio node in the second beam, where selecting of the second transmission rank is triggered before obtaining any Rank Indicator, RI, for the second antenna beam.

2. The method according to claim 1, further comprising:
obtaining first radio parameters related to the first antenna beam, and
wherein selecting the second transmission rank further is based on the first radio parameters.

3. The method according to claim 2, wherein the first radio parameters comprises a first signal strength and the second radio parameters comprises a second signal strength.

4. The method according to claim 3, wherein selecting the second transmission rank comprises any one of:
when the first signal strength is a first threshold value below the second signal strength, selecting a reduced second transmission rank;
when the first signal strength is a second threshold value above the second signal strength, selecting an increased second transmission rank,
when the first signal strength is a third threshold value close to equal to the second signal strength, selecting the same second transmission rank as used for the first transmission beam.

5. The method according to claim 1, wherein the second radio parameters comprise rank statistics of transmission ranks, collected over a period of time, used by one or more radio nodes communicating on a respective antenna beam.

6. The method according to claim 5, wherein the rank statistics of transmission ranks are further categorized into subgroups according to at least one of:
rank capabilities of the one or more radio nodes,
the distances of the one or more radio nodes to the first radio node,
the strength of the signals transmitted to or received from the one or more radio nodes.

7. The method according to claim 1, wherein selecting the second transmission rank further comprises: selecting a second Modulation transmission rank and Coding Scheme, MCS.

8. The method according to claim 1, wherein the at least first antenna beam and second antenna beam are provided by any one or more of: the second radio node and the radio node.

9. The method according to claim 1, further comprising:
switching from the first antenna beam to the second antenna beam, and
communicating with the second radio node by using the second antenna beam and the selected second transmission rank.

10. A first radio node for selecting a transmission rank, wherein the radio node is capable of using at least a first antenna beam and a second antenna beam for communication with a second radio node in a wireless communication network, the first radio node being configured to:
communicate with the second radio node by using the first antenna beam and a first transmission rank,
obtain second radio parameters for the second antenna beam,
select a second transmission rank based on the obtained second radio parameters, which second transmission rank is to be used for communication with the second radio node in the second beam, where the selection of the second transmission rank is to be triggered before obtaining any Rank Indicator, RI, for the second antenna beam,
switch from the first antenna beam to the second antenna beam, and
communicate with the second radio node by using the second antenna beam and the selected second transmission rank.

11. The first radio node according to claim 10, further being configured to:
obtain first radio parameters related to the first antenna beam, and
select the second transmission rank further based on the first radio parameters.

12. The first radio node according to claim 11, wherein the first radio parameters are adapted to comprise a first signal strength and the second radio parameters are adapted to comprise a second signal strength.

13. The first radio node according to claim 12, further being configured to: select the second transmission rank according to any one of:
   when the first signal strength is a first threshold value below the second signal strength, select a reduced second transmission rank;
   when the first signal strength is a second threshold value above the second signal strength, select an increased second transmission rank, and
   when the first signal strength is a third threshold value close to equal to the second signal strength, select the same second transmission rank as used for the first transmission beam.

14. The first radio node according to claim 10, wherein the second radio parameters is adapted to comprise rank statistics of transmission ranks, collected over a period of time, used by one or more radio nodes communicating on a respective antenna beam.

15. The first radio node according to claim 14, wherein the rank statistics of transmission ranks are adapted to be further categorized into subgroups according to one or more of:
   rank capabilities of the one or more radio nodes,
   the distances of the one or more radio nodes to the first radio node,
   the strength of the signals transmitted to or received from the one or more radio nodes.

16. The first radio node according to claim 10, wherein the first radio node further is configured to select the second transmission rank by further selecting a second Modulation transmission rank and Coding Scheme, MCS.

17. The first radio node according to claim 10, wherein the at least first antenna beam and second antenna beam are adapted to be provided by any one or more of: the second radio node and the radio node.

18. The first radio node according to claim 10, further being configured to:
   switch from the first antenna beam to the second antenna beam, and
   communicate with the second radio node by using the second antenna beam and the selected second transmission rank.

\* \* \* \* \*